(12) United States Patent
Ueki (10) Patent No.: US 11,380,996 B2
(45) Date of Patent: Jul. 5, 2022

(54) WIRELESS COMMUNICATION DEVICE

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 90 days.

(21) Appl. No.: 17/108,130

(22) Filed: Dec. 1, 2020

(65) Prior Publication Data
US 2021/0083391 A1    Mar. 18, 2021

Related U.S. Application Data

(63) Continuation of application No. PCT/JP2019/012076, filed on Mar. 22, 2019.

(30) Foreign Application Priority Data

Jul. 13, 2018    (JP)  .............................. JP2018-133176

(51) Int. Cl.
*H01Q 9/26*      (2006.01)
*H01Q 1/38*      (2006.01)
*G06K 19/077*   (2006.01)

(52) U.S. Cl.
CPC ........... *H01Q 9/26* (2013.01); *G06K 19/0773* (2013.01); *H01Q 1/38* (2013.01)

(58) Field of Classification Search
CPC .. H01Q 9/19; H01Q 9/26; H01Q 9/28; H01Q 9/285; H01Q 1/2225; H01Q 1/36; H01Q 1/38
See application file for complete search history.

(56) References Cited

U.S. PATENT DOCUMENTS

| | | | |
|---|---|---|---|
| 6,243,013 B1* | 6/2001 | Duan | G06K 19/07786 340/572.7 |
| 2007/0132593 A1 | 6/2007 | Yamazaki | |
| 2012/0154245 A1* | 6/2012 | Nagumo | H01Q 1/243 343/861 |

(Continued)

FOREIGN PATENT DOCUMENTS

| | | |
|---|---|---|
| JP | 2007089054 A | 4/2007 |
| JP | 2007164528 A | 6/2007 |

(Continued)

OTHER PUBLICATIONS

International Search Report Issued for PCT/JP2019/012076, dated Apr. 23, 2019.

(Continued)

*Primary Examiner* — Jason Crawford
(74) *Attorney, Agent, or Firm* — ArentFox Schiff LLP (57) ABSTRACT

An RFID tag is provided as a wireless communication device for transmitting and receiving a communication signal. The RFID tag includes a base material, antenna patterns formed on the base material, and an RFIC package that is a feeder circuit connected to the antenna patterns. In the antenna patterns, a line width at a harmonic current concentration portion where a current is strong at a frequency of harmonic resonance higher than a resonance frequency at a frequency of the communication signal is narrower than a line width at another portion of the antenna pattern.

20 Claims, 10 Drawing Sheets

(56) References Cited

U.S. PATENT DOCUMENTS

| | | | |
|---|---|---|---|
| 2015/0130683 A1* | 5/2015 | Kato | .................... H01Q 21/065 |
| | | | 343/905 |
| 2017/0270401 A1* | 9/2017 | Kato | ................ G06K 19/07758 |
| 2020/0034678 A1* | 1/2020 | Yazaki | ..................... H01Q 9/00 |
| 2021/0083361 A1* | 3/2021 | Ueki | .................. G06K 19/0775 |
| 2021/0083390 A1* | 3/2021 | Yazaki | ............. G06K 19/07798 |
| 2021/0083391 A1* | 3/2021 | Ueki | ....................... H01Q 9/285 |
| 2021/0111493 A1* | 4/2021 | Yazaki | ................ H01Q 1/2225 |
| 2021/0125017 A1* | 4/2021 | Kato | .................. G06K 19/0701 |

FOREIGN PATENT DOCUMENTS

| | | | |
|---|---|---|---|
| JP | 2006338563 A | 12/2016 | |
| WO | 2016098387 A1 | 6/2016 | |

OTHER PUBLICATIONS

Written Opinion of the International Searching Authority issued for PCT/JP2019/012076, dated Apr. 23, 2019.

\* cited by examiner

λ/4 RESONANCE fo

FIG. 2B

λ/2 RESONANCE 2fo

FIG. 2C

3λ/4 RESONANCE 3fo

FIG. 2D

λ RESONANCE 4fo

PRIOR ART

FIG. 10

WIRELESS COMMUNICATION DEVICE

CROSS REFERENCE TO RELATED APPLICATIONS

The present application is a continuation of PCT/JP2019/012076 filed Mar. 22, 2019, which claims priority to Japanese Patent Application No. 2018-133176, filed Jul. 13, 2018, the entire contents of each of which are incorporated herein by reference.

TECHNICAL FIELD

The present invention relates to a wireless communication device having an antenna, and, more particularly, to a wireless communication device such as an RFID (Radio Frequency Identification) tag that performs short-range communication via an induced electromagnetic field or an electromagnetic wave.

BACKGROUND

The RFID tag, which is a type of wireless communication device, is used in various situations because it communicates with a reader/writer to read and write predetermined information in a non-contact manner. For example, by attaching the RFID tags to all products, so-called self-checkout can be performed smoothly. In addition, sales and distribution status management such as ensuring traceability and marketing will be carried out smoothly.

On the other hand, a wide variety of products are handled at stores such as convenience stores and supermarkets, and some of the groceries as products are warmed or heated immediately after the purchase of the product to be taken home or to be eaten or drunk immediately on the spot by the purchaser. For example, lunch boxes and prepared dishes may be heated at a store using an electromagnetic wave heating device, such as a microwave oven.

However, when a product with an RFID tag is heated in a microwave oven, the following problems may occur.

In general, for the frequency of the communication signal of the RFID tag, the LF band of 135 kHz or less, the HF band of 13.56 MHz or the like, the UHF band of 860 MHz to 960 MHz, and the microwave band of 2.45 GHz or the like are mainly used. Currently, the types of RFID tags attached to food is an RFID tag that uses the UHF band. In the RFID tag that uses the UHF band, a metal material such as an antenna pattern, which is a metal film body, is formed on a base material such as paper or resin together with an RFIC (Radio-Frequency Integrated Circuit) element.

When a product with such an RFID tag is heated in a microwave oven, the energy of electromagnetic waves from the microwave oven is absorbed by the RFID tag together with the product. This causes a risk of ignition at the RFID tag, or the product part to which the RFID tag is attached, due to one or more of the following reasons: discharge at a place where the electric field strength is high in the above metal material part, heat generation and sublimation of metal material due to overcurrent flowing through the metal material part, and heat generation of RFID tag base material.

In particular, the microwave oven emits a high-power electromagnetic wave of about 3 kW into its chamber, and the RFID tag is heated at once immediately after the start of heating, so that when the conditions are met, it can be said that the above-mentioned risk of ignition is high.

A configuration of a "flame-retardant" tag has been proposed for the purpose of reducing the risk of ignition in the RFID tag as described above, and, for example, as described in Japanese Patent Unexamined Publication No. 2006-338563 (hereinafter "Patent Literature 1").

The "flame-retardant" tag disclosed in Patent Literature 1 has a base material formed of a flame-retardant material on which an IC chip and an antenna pattern are mounted. Therefore, the combustion of the base material is suppressed. However, the metal material portion formed on the base material has a high possibility of temporally continuous discharge, and the tag does not have a configuration capable of reliably preventing the risk of ignition of the base material and the possibility that the product catches fire.

SUMMARY OF THE INVENTION

Accordingly, it is an object of the present invention is to provide a wireless communication device constructed to prevent ignition or combustion even when it is attached to food or the like and receives high frequency electric power for heating food, by a microwave oven, for example.

Thus, a wireless communication device according to one exemplary aspect is provided for transmitting and receiving a communication signal and includes a base material; an antenna pattern formed on the base material; and a feeder circuit connected to the antenna pattern. Moreover, in the antenna pattern, a line width at a harmonic current concentration portion where a current is strong at a frequency of harmonic resonance higher than a resonance frequency at a frequency of the communication signal is narrower than a line width at other portions of the antenna pattern.

According to the above structure and configuration, when the frequency of the communication signal is lower than the frequency of the microwave for electromagnetic wave heating, harmonic resonance occurs at the wireless communication device with the microwave for electromagnetic wave heating. Therefore, when the wireless communication device receives the microwave for electromagnetic wave heating, heat is intensively generated at the harmonic current concentration portion due to Joule heat. Moreover, since this harmonic current concentration portion is a portion with a narrow line width (hereinafter referred to as "narrow portion"), the narrow portion of the antenna pattern or the base material on which the narrow portion of the antenna pattern is arranged is melted and cut due to temperature rise or is cut by sublimation. That is, the antenna pattern is separated at the narrow portion. When the antenna pattern is separated at the narrow portion, the resonance (harmonic resonance) no longer occurs at the antenna pattern with the microwave for electromagnetic wave heating, so that the heat generation of the antenna pattern is not maintained and the temperature rise due to the harmonic resonance is stopped. Therefore, the ignition of the wireless communication device or the product portion to which the wireless communication device is attached is prevented.

According to the exemplary embodiments of the present invention, a wireless communication device is provided that is constructed to prevent ignition and combustion even when it is attached to food or the like and receives high frequency electric power for heating food.

DETAILED DESCRIPTION OF EMBODIMENTS

First, the configurations of various exemplary aspects of the wireless communication device according to the present invention will be described.

The wireless communication device of the first exemplary aspect is a wireless communication device for transmitting and receiving a communication signal. In this aspect, the wireless communication device includes a base material; an antenna pattern formed on the base material; and an RFIC element connected to the antenna pattern. Moreover, in the antenna pattern, a line width at a harmonic current concentration portion where a current is strong at a frequency of harmonic resonance higher than a resonance frequency at a frequency of the communication signal is narrower than a line width at another portion.

In the wireless communication device of the first exemplary aspect configured as described above, for example, when the wireless communication device is irradiated with microwave in the microwave oven, each part of the wireless communication device is heated by the microwave, and the antenna pattern is quickly cut off at a predetermined location to prevent ignition due to heat generation of the antenna pattern.

In the wireless communication device of the second exemplary aspect, the antenna pattern is a pattern defining a dipole-type electric field antenna whose feeding end is connected to the feeder circuit and whose tip is an open end that is opposite the feeding end, and the harmonic current concentration portion is at an intermediate position from the feeding end to the open end.

In the wireless communication device of the third exemplary aspect, the resonance at the frequency of the communication signal is ¼ wavelength resonance with respect to a region from the feeding end to the open end, and the harmonic resonance is ½ wavelength resonance with respect to the region from the feeding end to the open end.

In the wireless communication device of the fourth exemplary aspect, the resonance at the frequency of the communication signal is ¾ wavelength resonance with respect to the region from the feeding end to the open end, and the harmonic resonance is one wavelength resonance with respect to the region from the feeding end to the open end.

In the wireless communication device of the fifth exemplary aspect, the antenna pattern has a meander line shape.

In the wireless communication device of the sixth exemplary aspect, the frequency of the communication signal is a frequency in a UHF band, and the frequency of the harmonic resonance is a frequency of 2.4 GHz or more and 2.5 GHz or less.

In general, convenience stores and supermarkets that sell products with wireless communication devices handle a wide variety of products such as food and daily necessities. In recent years, various experiments have been conducted on convenience stores toward the practical application of "unmanned" convenience stores that automate accounting and bagging of purchased products.

In order to automate product accounting in "unmanned" convenience stores, it is considered to attach RFID tags, which are wireless communication devices, to all products. In the "unmanned" convenience store, when a shopping basket containing products with RFID tags is placed on the checkout table, the information from the RFID tags is read and the product price is displayed. The purchaser can either put cash as the product price into the cash slot or insert a credit card to complete the payment and receive the product automatically packed in the shopping bag to complete the purchase of the product at the "unmanned" convenience store.

Hereinafter, exemplary embodiments of the wireless communication device according to the present invention will be described with reference to the accompanying drawings. The products to which the wireless communication devices according to the present invention are attached include all products handled at retail stores, such as convenience stores and supermarkets.

The electromagnetic wave heating device described in the following embodiment will be described as a microwave oven that performs dielectric heating, but it is noted that the electromagnetic wave heating device in the present invention is a heating device having a function of performing dielectric heating. Further, in the following exemplary embodiments, the RFID tag attached to the above product will be described as an example of the wireless communication device.

Hereinafter, a plurality of exemplary embodiments according to the present invention will be shown. It is noted that the same reference numerals are given to the same parts in the drawings referred to in each embodiment. In consideration of ease of explanation or understanding of the main points, the embodiments are shown separately for convenience, but partial replacement or combination of configurations shown in different embodiments is possible. In the second and subsequent embodiments, descriptions of matters common to the first embodiment are omitted, and only different points will be described. In particular, the same operational effect by the same configuration will not be successively described for each embodiment.

First Exemplary Embodiment

Figure 1A:
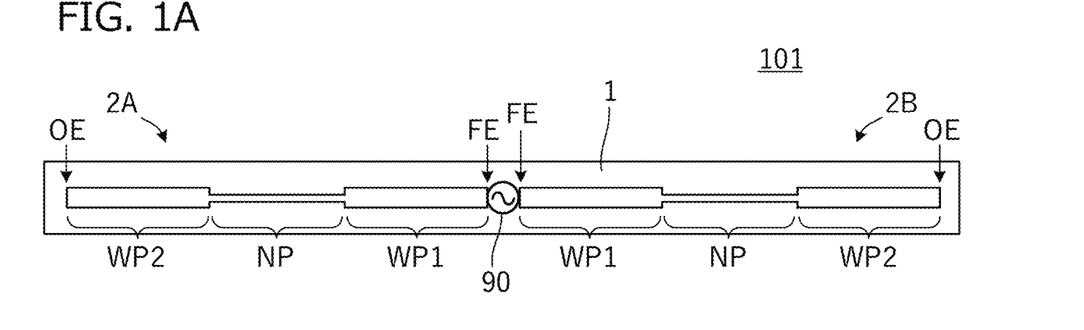
FIG. 1A is a plan view of an RFID tag 101 according to a first exemplary embodiment.
Figure 1B:
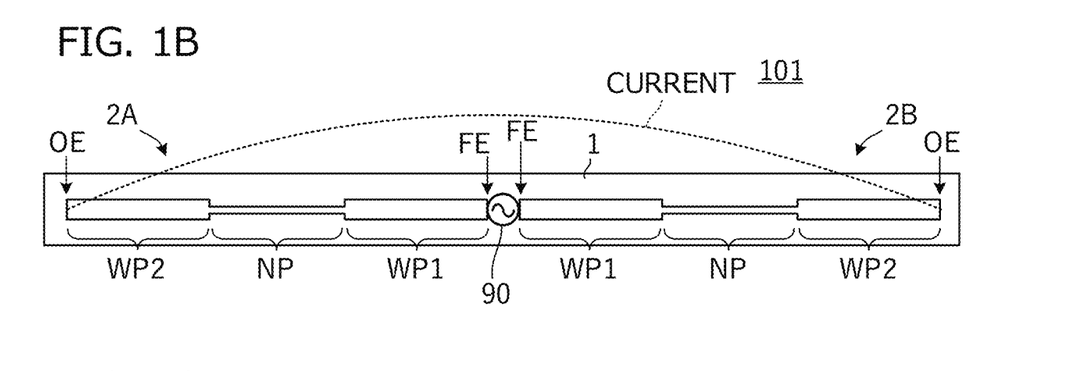
FIGS. 1B and 1C are diagrams showing intensity distributions of currents flowing through an antenna pattern of the RFID tag 101.
Figure 1C:
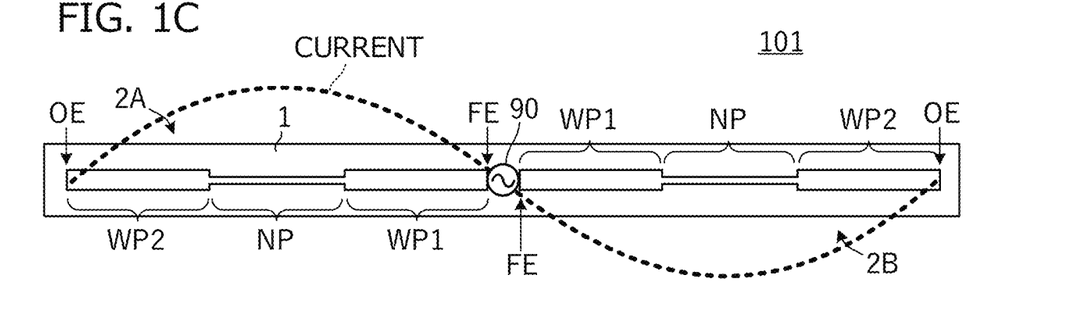
Figure 1D:
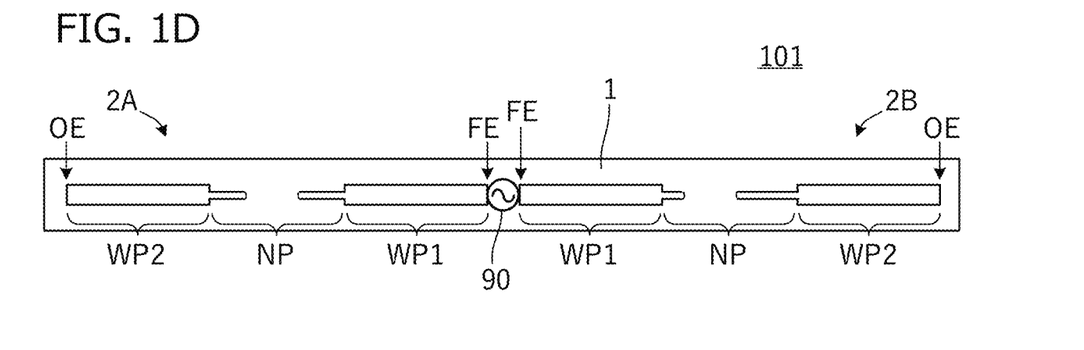
FIG. 1D is a plan view of an RFID tag showing a state of the antenna pattern after fusing by melting or cutting by sublimation.

FIG. 1A is a plan view of an RFID tag 101 according to the first embodiment, and FIGS. 1B and 1C are diagrams showing the intensity distributions of currents flowing through the antenna pattern of the RFID tag 101. Further, FIG. 1D is a plan view of the RFID tag showing a state of the antenna pattern after cutting by melting or by sublimation.

As shown in FIG. 1A, the RFID tag 101 includes a base material 1 of an insulator or dielectric, antenna patterns 2A and 2B formed on the base material 1, and a feeder circuit 90 that supplies power to the antenna patterns 2A and 2B.

The RFID tag 101 of the present embodiment is configured to perform wireless communication (e.g., transmission/reception) with a high frequency signal including the frequency (i.e., a carrier frequency) of the communication signal in the UHF band. The UHF band is a frequency band from 860 MHz to 960 MHz. Here, the frequency of the communication signal in the UHF band is an example of the "frequency of the communication signal" in the present disclosure.

In the exemplary aspect, the feeder circuit 90 is, for example, an RFIC element, an RFIC package, or the like, which will be exemplified later. In the RFID tag 101 of the present embodiment, a flexible film material or a flame-retardant film material is used as the base material 1. As shown, the outer shape of the base material 1 in a plan view can be rectangular. When the base material 1 is a normal film material that is not flame-retardant, the thickness of the base material 1 may be as thin as 38 μm or less. As a result, before burning, the base material 1 melts and deforms, allowing the shape of the base material not to be maintained.

When a flame-retardant film is used for the base material 1, as the flame-retardant film material used, for example, a film obtained by adding a halogen-based flame-retardant material or coating a flame-retardant coating material to a resin material such as PET (polyethylene terephthalate) resin or PPS (polyphenylene sulfide) resin is used. Further, as the material of the base material 1, it is also possible to use a resin material having high functions in terms of heat resistance, hydrolysis resistance, and chemical resistance, such as PEN (polyethylene naphthalate) resin having heat resistance. It is noted that the base material 1 does not necessarily need a flame-retardant material, and may be made of, for example, a paper material in an alternative aspect.

The antenna patterns 2A and 2B formed by a film of a conductive material such as an aluminum foil or a copper foil are formed on the surface of the base material 1. Further, the feeder circuit 90 is electrically connected to the antenna patterns 2A and 2B formed on the surface of the base material 1.

As shown in FIG. 1A, the antenna patterns 2A and 2B are extended from the feeder circuit 90 in opposite directions, respectively.

The current waveform shown in FIG. 1B shows a current distribution in fundamental wave resonance in which a standing wave of ¼ wavelength is generated in each of the first antenna pattern 2A and the second antenna pattern 2B from the feeding end to the open end. Fundamental wave resonance occurs at the RFID tag 101 in this way at the frequency of the communication signal. As described above, the antenna patterns 2A and 2B of the RFID tag 101 of the present embodiment act as a dipole type electric field antenna during communication as the RFID tag.

The current waveform shown in FIG. 1C shows a current distribution in harmonic resonance in which a standing wave of ½ wavelength is generated in each of the first antenna pattern 2A and the second antenna pattern 2B from the feeding end to the open end. Harmonic resonance occurs at the RFID tag 101 in this way at the frequency of the microwave for electromagnetic wave heating.

As shown in FIGS. 1A, 1B, and 1C, the first antenna pattern 2A and the second antenna pattern 2B are not constant in the line width from the connection end FE of the feeder circuit 90 to the open end OE. Instead, each of the antenna patterns 2A and 2B has a narrow portion NP with a narrow line width at an intermediate position. That is, each of the antenna patterns 2A and 2B has a first wide portion WP1 from the connection end FE of the feeder circuit 90 to the narrow portion NP, and a second wide portion WP2 from the narrow portion NP to the open end OE.

When the RFID tag 101 communicates with the reader/writer, the current in the fundamental wave resonance is distributed as shown in FIG. 1B. In this communication state, the current concentration on the narrow portion NP is not strong, so that there is almost no loss due to the narrow line width, and there is almost no decline in antenna efficiency.

On the other hand, in a state where microwave for electromagnetic wave heating is irradiated, harmonic resonance occurs at the antenna patterns 2A and 2B with the microwave, and a harmonic current as shown in FIG. 1C flows. In this state, the narrow portion NP is a harmonic current concentration portion where the current is strong at the frequency of the harmonic resonance, as shown in FIG. 1C. Moreover, since this "harmonic current concentration portion" is the narrow portion NP, the current of the narrow portion NP is even stronger than that of the first wide portion WP1 and the second wide portion WP2. Therefore, the energy of the microwave for electromagnetic wave heating is concentrated in the narrow portion NP. That is, the energy of the microwave for electromagnetic wave heating is intensively consumed in the narrow portion NP, and the temperature of the narrow portion NP is raised by Joule heat. When the temperature of the narrow portion NP exceeds a certain threshold value, the narrow portion NP is cut by melting or by sublimation. That is, the narrow portion NP having strong harmonic current acts like a "fuse" for the microwave for electromagnetic wave heating.

According to an exemplary aspect, the relationship between the line widths of the wide portion WP1, WP2 and the narrow portion NP is preferably such a relationship that as the wide portion is 300 μm or more and the narrow portion is 150 μm or less. Moreover, the cross-sectional area ratio (i.e., the wide portion cross-sectional area/narrow portion cross-sectional area) of the wide portion to the narrow portion of the antenna patterns 2A and 2B preferably exceeds two. This configuration also applies to the other embodiments described below.

As shown in FIG. 1D, when the antenna patterns 2A and 2B are separated at the narrow portion NP, the second wide portion WP2 of the antenna patterns 2A and 2B is isolated and thus does not act as the antenna pattern (radiating element), and the effective line length of the antenna patterns 2A and 2B becomes shorter. In this state, the harmonic resonance shown in FIG. 1C cannot be maintained, and even when the irradiation of the microwave for electromagnetic wave heating continues, the above harmonic current does not flow in the antenna patterns 2A and 2B, and the temperature rise stops and ignition does not occur.

In the examples shown above, the narrow portion NP itself of the antenna patterns 2A and 2B is cut by melting or by sublimation, but the base material 1 near the narrow portion NP may be melted or sublimated due to temperature rise of the narrow portion NP, and as a result, the antenna patterns 2A and 2B may be separated at the narrow portion NP.

In the example shown above, at the antenna patterns 2A and 2B, fundamental wave resonance occurs at ¼ wavelength at the frequency of the communication signal, and harmonic resonance (more specifically, secondary harmonic resonance) occurs at ½ wavelength at the frequency for electromagnetic wave heating. However, as illustrated below, there are also other combinations of the resonance mode at the frequency of the communication signal and the resonance mode at the frequency for electromagnetic wave heating.

Figure 2A:
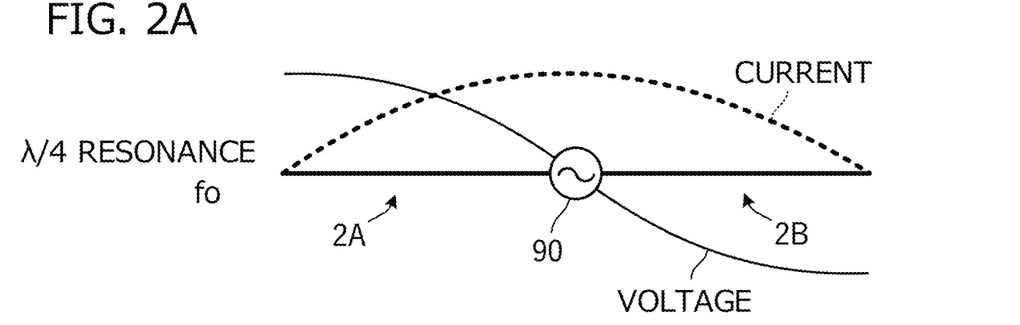
FIG. 2A, FIG. 2B, FIG. 2C, and FIG. 2D are diagrams showing an example of a resonance mode at the frequency of the communication signal or a resonance mode at the frequency of the microwave for electromagnetic wave heating.
Figure 2B:
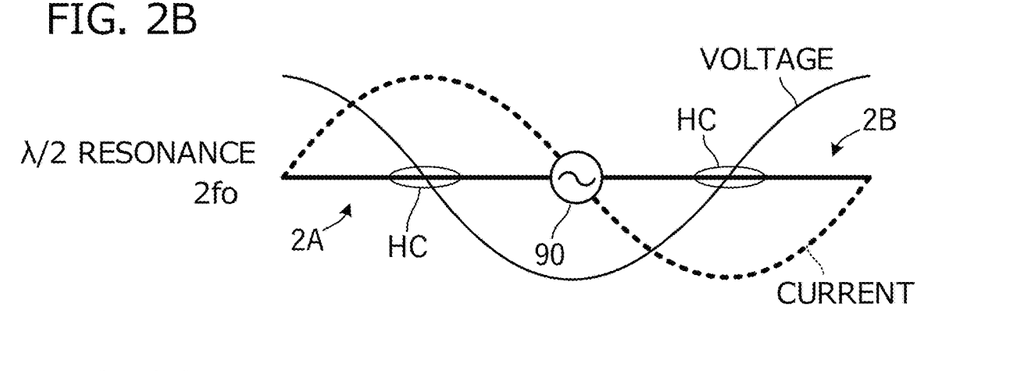
Figure 2C:
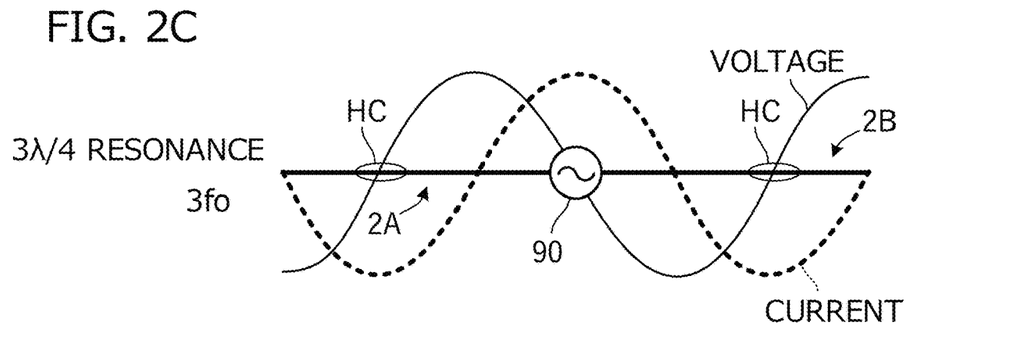

FIGS. 2A, 2B, 2C, and 2D are diagrams showing examples of a resonance mode at the frequency of the communication signal or a resonance mode at the frequency of the microwave for electromagnetic wave heating with the current distribution and voltage distribution. In a resonance mode shown in FIG. 2A, which is the resonance mode already shown in FIG. 1B, fundamental wave resonance occurs at a resonance frequency fo at ¼ wavelength from the feeding end to the open end. In a resonance mode shown in FIG. 2B, harmonic resonance occurs at a resonance frequency 2fo at ½ wavelength from the feeding end to the open end. In a resonance mode shown in FIG. 2C is the resonance mode already shown in FIG. 1C, harmonic resonance occurs at a resonance frequency 3fo at a ¾ wavelength from the feeding end to the open end. In a resonance mode shown in FIG. 2D, harmonic resonance occurs at a resonance frequency 4fo at one wavelength from the feeding end to the open end. In addition, in FIG. 2A, FIG. 2B, FIG. 2C, and FIG. 2D, the amplitude directions of the current distribution and voltage distribution are normalized. It is noted that this also applies to the current distribution and voltage distribution shown below.

Figure 2D:
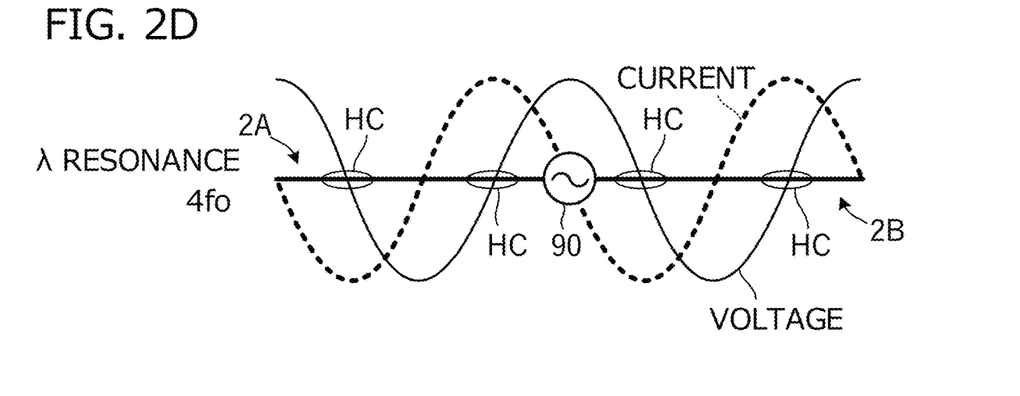

Under the condition that high-order resonance modes as shown in FIG. 2B, FIG. 2C, and FIG. 2D occur at the frequency of the microwave for electromagnetic wave heating, a high current density region HC having a high current density is generated on the antenna patterns 2A and 2B. An example in which the high current density region HC having a strong current is set as a narrow portion on the antenna patterns 2A and 2B in FIG. 2B has already been shown in FIG. 1C. Similarly, also in the harmonic resonance mode as shown in FIGS. 2C and 2D, the high current density region HC may be set as the narrow portion.

Second Exemplary Embodiment

In the second embodiment, an RFID tag having a meander line-shaped antenna pattern is shown.

First, regarding fundamental resonance and harmonic resonance, the difference between an RFID tag having a meander line-shaped antenna pattern and an RFID tag having a linear antenna pattern as shown in the first embodiment will be described.

Figure 9:
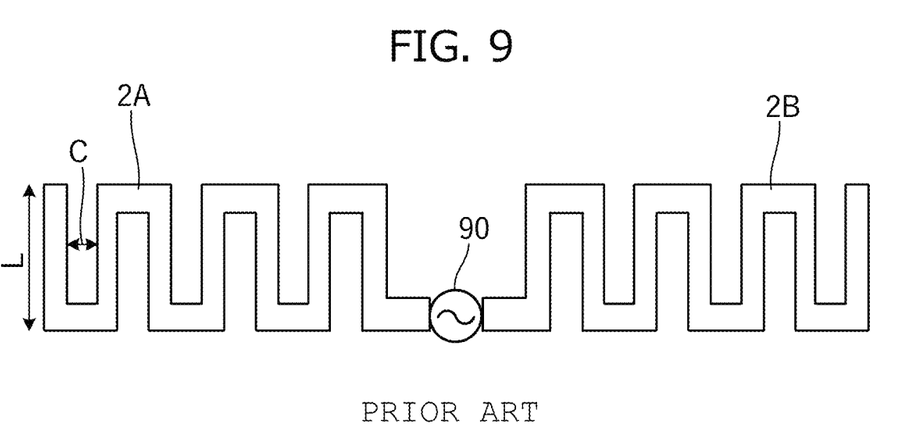
FIG. 9 is a plan view showing an example of an antenna pattern of a conventional RFID tag including antenna patterns 2A and 2B having a meander line shape.

FIG. 9 is a plan view showing an example of an antenna pattern of a conventional RFID tag having antenna patterns 2A and 2B in a meander line shape. FIG. 9 shows an inductance component L of a conductor pattern and a capacitance component C between adjacent conductor patterns. As a method of miniaturizing the antenna, it is common to make the antenna pattern into a meander line shape, but between the fundamental wave resonance and harmonic resonance of the antenna patterns 2A and 2B, the effects of making the antenna pattern into a meander line shape are different. That is, when the antenna pattern has a meandering line shape, the inductance component L and the capacitance component C increase due to the adjacency between the conductor patterns, and the resonance frequency shifts to a low frequency range. However, in the fundamental wave resonance, the maximum point of the current or voltage occurs only at one place, but in the harmonic resonance, the maximum point of the current or voltage occurs at a plurality of places. Therefore, the harmonic resonance is greatly affected by the inductance component L and the capacitance component C as compared with the fundamental wave resonance. Therefore, the harmonic resonance has a larger low-frequency shift amount of the resonance frequency due to the above-mentioned meander line shape as compared with the fundamental wave resonance. For example, the condition tends to become such that at the antenna patterns 2A and 2B, fundamental wave resonance occurs at the frequency of the communication signal in the UHF band from 860 MHz to 960 MHz, and harmonic resonance (more specifically, second harmonic resonance) occurs at a frequency 2.45 GHz for electromagnetic wave heating.

Figure 3A:
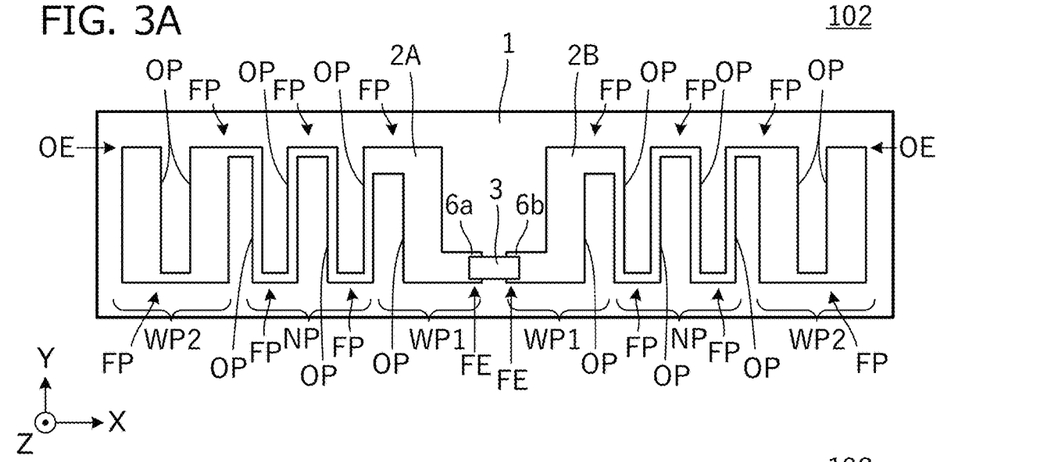
FIG. 3A is a plan view of an RFID tag 102 according to a second exemplary embodiment.
Figure 3B:
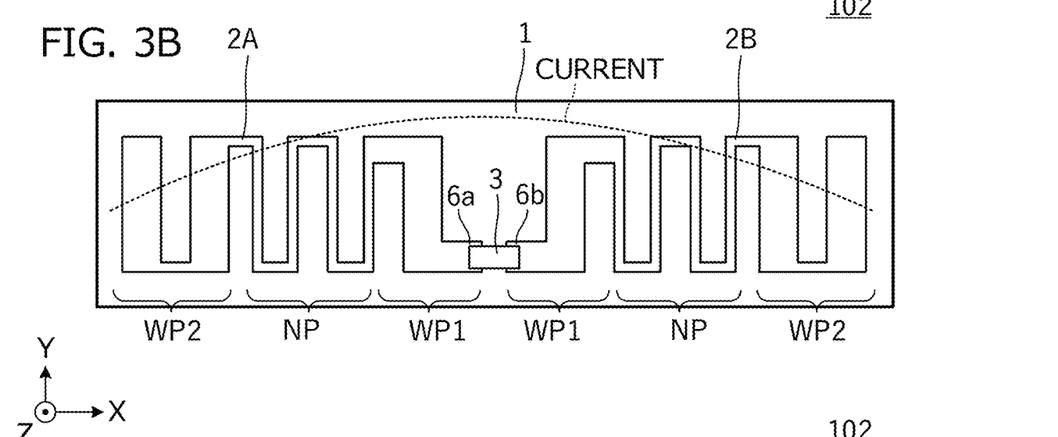
FIGS. 3B and 3C are diagrams showing intensity distributions of currents flowing through an antenna pattern of the RFID tag 102.
Figure 3C:
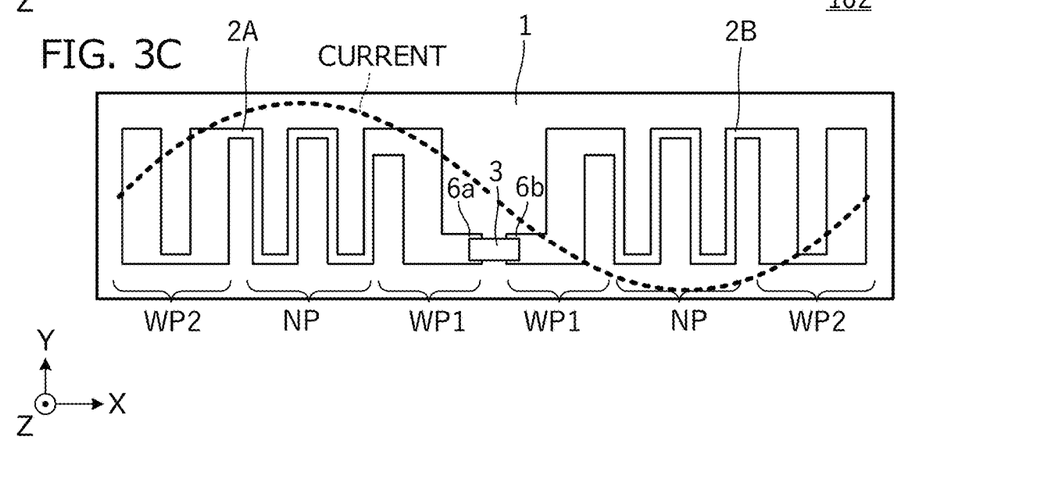
Figure 10:
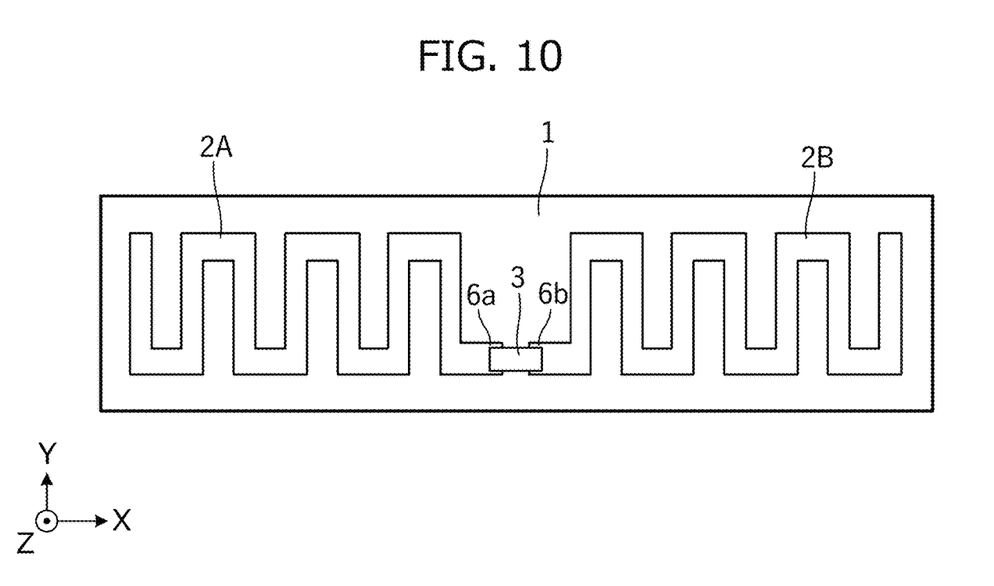
FIG. 10 is a plan view of an RFID tag as a comparative example.

FIG. 3A is a plan view of the RFID tag 102 according to the second embodiment, and FIGS. 3B and 3C are diagrams showing the intensity distribution of the current flowing through the antenna pattern of the RFID tag 102. Further, FIG. 10 is a plan view of an RFID tag as a comparative example.

As shown in FIG. 3A, the RFID tag 102 includes an insulator or dielectric base material 1, antenna patterns 2A and 2B formed on the base material 1, and an RFIC package 3 connected to the antenna patterns 2A and 2B.

Figure 4:
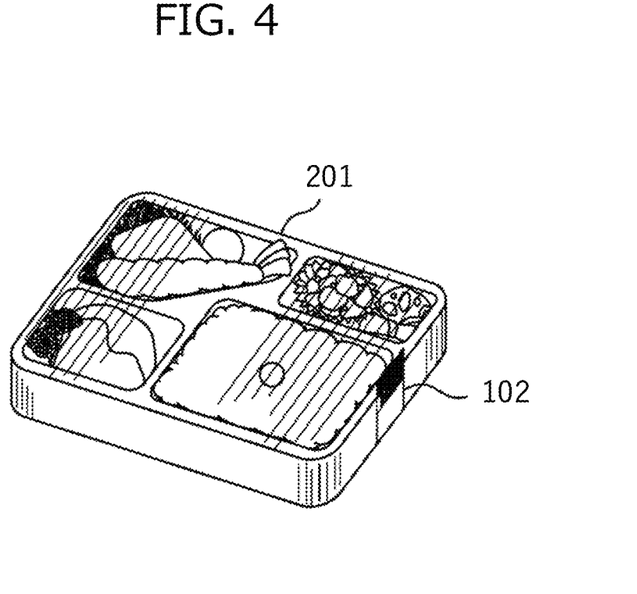
FIG. 4 is a diagram showing an example of a product with an RFID tag, and is a perspective view of a lunch box 201 with the RFID tag 102.

FIG. 4 is a diagram showing an example of a product with an RFID tag, and is a perspective view of a lunch box 201 with the RFID tag 102.

The RFID tag 102 of the present embodiment is configured to perform wireless communication (e.g., transmission/reception) with a high frequency signal including the frequency (i.e., a carrier frequency) of the communication signal in the UHF band. The UHF band is a frequency band from 860 MHz to 960 MHz. Here, the frequency of the communication signal in the UHF band is an example of the "frequency of the communication signal" in the present disclosure.

The antenna patterns 2A and 2B formed by a film of a conductive material such as an aluminum foil or a copper foil are formed on the surface of the base material 1. Further, the RFIC package 3 is mounted on the antenna patterns 2A and 2B formed on the surface of the base material 1, and the RFIC package 3 and the antenna patterns 2A and 2B are electrically connected to each other. It is noted that for purposes of this disclosure, "electrically connected" means that components are connected or coupled to each other such that a high-frequency signal is transmitted therebetween and they are operable, and is not limited to DC or direct connection.

As shown in FIG. 3A, the antenna patterns 2A and 2B each have a meander line shape, and are configured such that the meander line-shaped first antenna pattern 2A that has a plurality of folded-back portions FP and meanders from a first land pattern 6a on which the RFIC package 3 is mounted and the meander line-shaped second antenna pattern 2B that has a plurality of folded-back portions and meanders from a second land pattern 6b on which the RFIC package 3 is mounted are extended respectively. That is, the meander line-shaped first antenna pattern 2A is extended from the first land pattern 6a toward one end in the longitudinal direction of the base material 1 (i.e., in the −X direction). Further, the meander line-shaped second antenna pattern 2B is extended from the second land pattern 6b toward the other end in the longitudinal direction of the base material 1 (i.e., in the +X direction).

With the above configuration, the antenna patterns 2A and 2B are configured to form a dipole type electric field antenna.

The folded-back portion FP of the antenna patterns 2A and 2B is a portion where the extending direction of the antenna patterns 2A and 2B is reversed. The antenna patterns 2A and 2B include the conductor patterns OP facing each other by being folded back at the folded-back portion FP.

As described above, the antenna patterns 2A and 2B are a metal material having high conductivity such as an aluminum electrode and a copper electrode. As the antenna patterns 2A and 2B, a carbon-based material other than metal material may be used.

As shown in FIG. 3A, the line widths of the first antenna pattern 2A and the second antenna pattern 2B are not constant from the connection end FE of the RFIC package 3 to the open end OE, and each of the antenna patterns has a narrow portion NP having a narrow line width at an intermediate position. That is, each of the antenna patterns 2A and 2B has a first wide portion WP1 from the connection end FE of the RFIC package 3 to the narrow portion NP, and a second wide portion WP2 from the narrow portion NP to the open end OE. As described above, the RFID tag 102 differs from the RFID tag as a comparative example shown in FIG. 10 in that it includes the narrow portion NP and the wide portions WP1 and WP2.

In a state where the RFID tag 102 communicates with the reader/writer, the current in the fundamental wave resonance is distributed as shown in FIG. 3B. In this communication state, the current concentration on the narrow portion NP is not strong, so that there is almost no loss due to the narrow line width. Rather, the line width of the first wide portion WP1 having a strong current is thick, so that the loss can be reduced.

On the other hand, in a state where the microwave for electromagnetic wave heating is irradiated, at the antenna patterns 2A and 2B, harmonic resonance occurs with the microwave, and the harmonic current shown in FIG. 3C flows. In this state, the narrow portion NP is a harmonic current concentration portion where the current is strong at the frequency of the harmonic resonance, as shown in FIGS. 3A and 3C. Moreover, since this "harmonic current concentration portion" is the narrow portion NP, the current of the narrow portion NP is even stronger than that of the first wide portion WP1 and the second wide portion WP2. Therefore, similarly to the RFID tag 101 shown in the first embodiment, the energy of the microwave for electromagnetic wave heating is concentrated in the narrow portion NP. That is, the energy of the microwave for electromagnetic wave heating is intensively consumed in the narrow portion NP, and the temperature of the narrow portion NP is raised by Joule heat. When the temperature of the narrow portion NP exceeds a certain threshold value, the narrow portion NP is cut by melting or by sublimation.

Compared to the RFID tag 101 shown in the first embodiment, in the RFID tag 102 of the second embodiment, the distance between the conductor patterns OP facing each other in the narrow portion NP is narrower, so that the location where the Joule heat is generated is concentrated, and the temperature raising effect of the narrow portion NP is high. Therefore, the time from the irradiation of the microwave for electromagnetic wave heating to the separation of the antenna patterns 2A and 2B at the narrow portion NP can be shortened.

Figure 5:
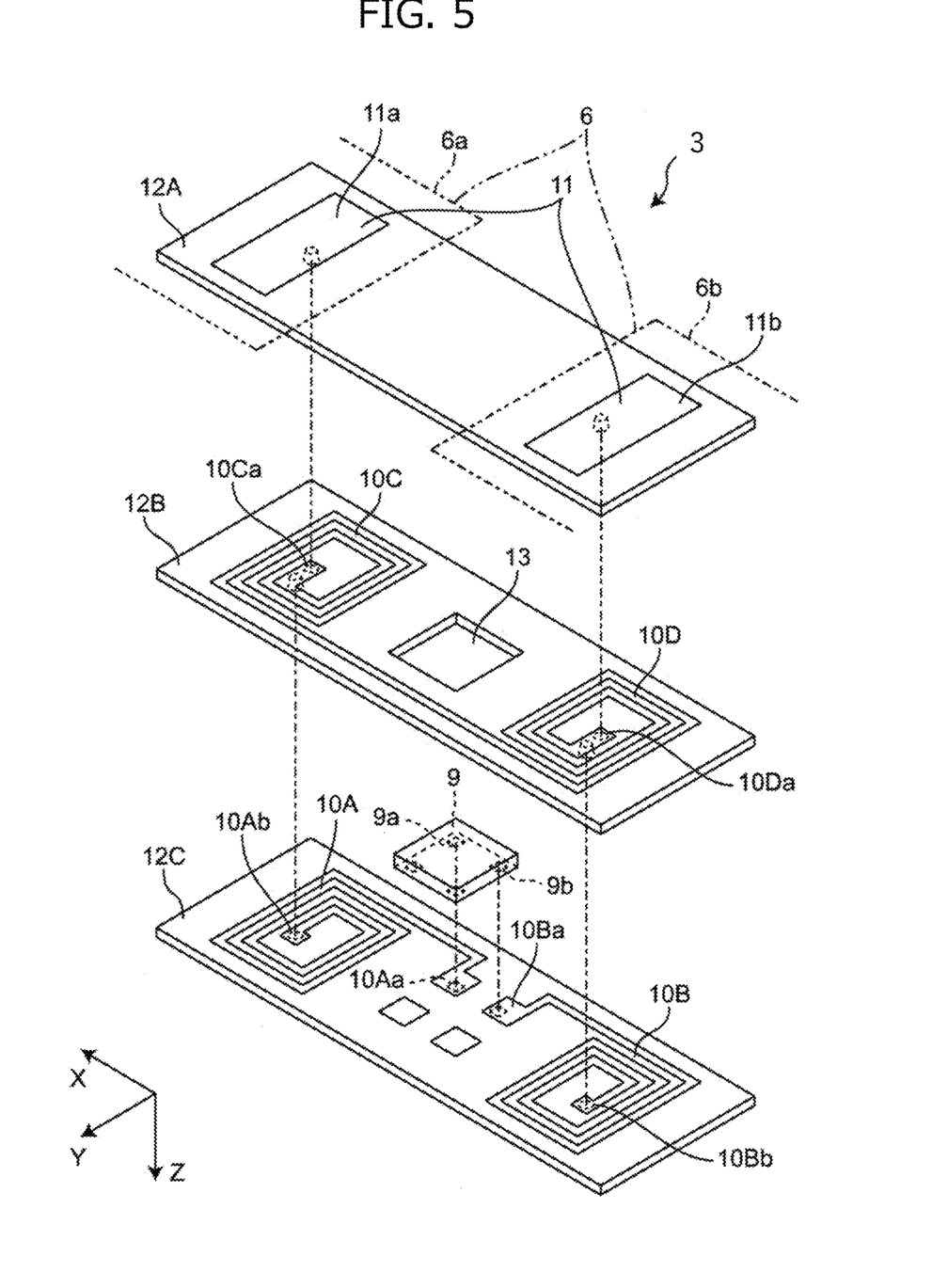
FIG. 5 is an exploded perspective view showing a configuration of an RFIC package 3 mounted on land patterns 6 (6a, 6b) of antenna patterns 2A and 2B.

FIG. 5 is an exploded perspective view showing the configuration of the RFIC package 3 mounted on the land patterns 6 (6a, 6b) of the antenna patterns 2A and 2B. As shown in FIG. 5, the RFIC package 3 in the first embodiment is composed of a multilayer substrate including three layers. Specifically, the multilayer substrate of RFIC Package 3 is made of a resin material such as polyimide or liquid crystal polymer, and includes three flexible insulating sheets 12A, 12B, and 12C which are laminated. Each of the insulating sheets 12A, 12B, and 12C has a substantially quadrilateral shape in a plan view, and has a substantially rectangular shape in the present embodiment. The RFIC package 3 shown in FIG. 5 shows a state in which the RFIC package 3 shown in FIG. 3A is turned upside down and the three layers are disassembled.

As shown in FIG. 5, the RFIC package 3 has an RFIC chip 9, a plurality of inductance elements 10A, 10B, 10C, 10D, and external connection terminals 11 (11a, 11b) connected to the antenna patterns 2A and 2B, which are formed at desired positions on the three-layer substrate (insulating sheets 12A, 12B, 12C).

The external connection terminals 11a and 11b are formed on the first insulating sheet 12A which is the lowermost layer (i.e., the substrate facing the antenna patterns 2A and 2B), and are formed at positions facing the land patterns 6a and 6b of the antenna patterns 2A and 2B. The four inductance elements 10A, 10B, 10C, and 10D are separated into groups of two and formed on the second insulating sheet 12B and the third insulating sheet 12C. That is, the first inductance element 10A and the second inductance element 10B are formed on the third insulating sheet 12C, which is the uppermost layer (i.e., the layer shown at the bottom in FIG. 5), and the third inductance element 10C and the fourth inductance element 10D are formed on the second insulating sheet 12B, which is the intermediate layer.

In the RFIC package 3 of the present embodiment, each of the external connection terminals 11a, 11b and the four inductance elements 10A, 10B, 10C, 10D is composed of a conductor pattern made of a conductive material such as an aluminum foil or a copper foil.

As shown in FIG. 5, the RFIC chip 9 is mounted on the third insulating sheet 12C, which is the uppermost layer, in the central portion in the longitudinal direction (i.e., the X direction in FIG. 5). The RFIC chip 9 has a structure in which an RF circuit is formed on a semiconductor substrate made of a semiconductor such as silicon. The first inductance element 10A formed in a spiral shape on one side in the longitudinal direction (i.e., the side in the +X direction in FIG. 5) on the third insulating sheet 12C is connected to one input/output terminal 9a of the RFIC chip 9 via a land 10Aa. The second inductance element 10B formed in a spiral shape on the other side in the longitudinal direction (i.e., the side in the −X direction in FIG. 5) on the third insulating sheet 12C is connected to the other input/output terminal 9b of the RFIC chip 9 via a land 10Ba.

The third inductance element 10C in a spiral shape is formed on one side in the longitudinal direction (i.e., the side in the +X direction in FIG. 5) on the second insulating sheet 12B, which is an intermediate layer, and the fourth inductance element 10D in a spiral shape is formed on the other side in the longitudinal direction (i.e., the side in the −X direction in FIG. 5) on the second insulating sheet 12B. The outer peripheral end of the third inductance element 10C in the spiral shape and the outer peripheral end of the fourth inductance element 10D in the spiral shape are directly connected. On the other hand, a land 10Ca, which is the inner peripheral end of the third inductance element 10C, is connected to a land 10Ab, which is the inner peripheral end of the first inductance element 10A in a spiral shape on the third insulating sheet 12C, via an interlayer connecting conductor such as a via conductor penetrating the second insulating sheet 12B. Further, the land 10Ca, which is the inner peripheral end of the third inductance element 10C, is connected to a first external connection terminal 11a on the first insulating sheet 12A via an interlayer connecting conductor such as a through-hole conductor penetrating the first insulating sheet 12A which is the lowermost layer.

A land 10Da, which is the inner peripheral end of the fourth inductance element 10D, is connected to a land 10Bb, which is the inner peripheral end of the second inductance element 10B in a spiral shape on the third insulating sheet 12C, via an interlayer connecting conductor such as a through-hole conductor penetrating the second insulating sheet 12B. Further, the land 10Da, which is the inner peripheral end of the fourth inductance element 10D, is connected to a second external connection terminal 11b on the first insulating sheet 12A via an interlayer connecting conductor such as a through-hole conductor penetrating the first insulating sheet 12A which is the lowermost layer.

The first external connection terminal 11a on the first insulating sheet 12A is arranged so as to be connected to the first land pattern 6a of the first antenna pattern 2A formed on the base material 1. Further, the second external connection terminal 11b on the first insulating sheet 12A is arranged so as to be connected to the second land pattern 6b of the second antenna pattern 2B formed on the base material 1.

Further, the second insulating sheet 12B, which is an intermediate layer, is formed with a through hole 13 in which the RFIC chip 9 mounted on the third insulating sheet 12C is housed. As further shown, the RFIC chip 9 is arranged between the first inductance element 10A and the second inductance element 10B, and between the third inductance element 10C and the fourth inductance element 10D. Therefore, the RFIC chip 9 is configured to function as a shield, and magnetic field coupling and electric field coupling between the first inductance element 10A and the second inductance element 10B are suppressed. Similarly, magnetic field coupling and electric field coupling between the third inductance element 10C and the fourth inductance element 10D are suppressed. As a result, in the RFIC Package 3, the narrowing of a pass band of the communication signal is suppressed, and the pass band is widened.

In the present embodiment, the RFIC package 3 is mounted on the antenna patterns 2A and 2B, but the RFIC chip 9 may be mounted directly on the antenna patterns 2A and 2B. Further, at this time, the inductors configured as the plurality of inductance elements 10A, 10B, 10C, 10D in the RFIC package 3 may be configured on the base material 1 by a loop-shaped pattern.

Third Exemplary Embodiment

In the third embodiment, some RFID tags whose antenna pattern shape is different from that of the example shown in the second embodiment are shown with reference to each figure.

Figure 6:
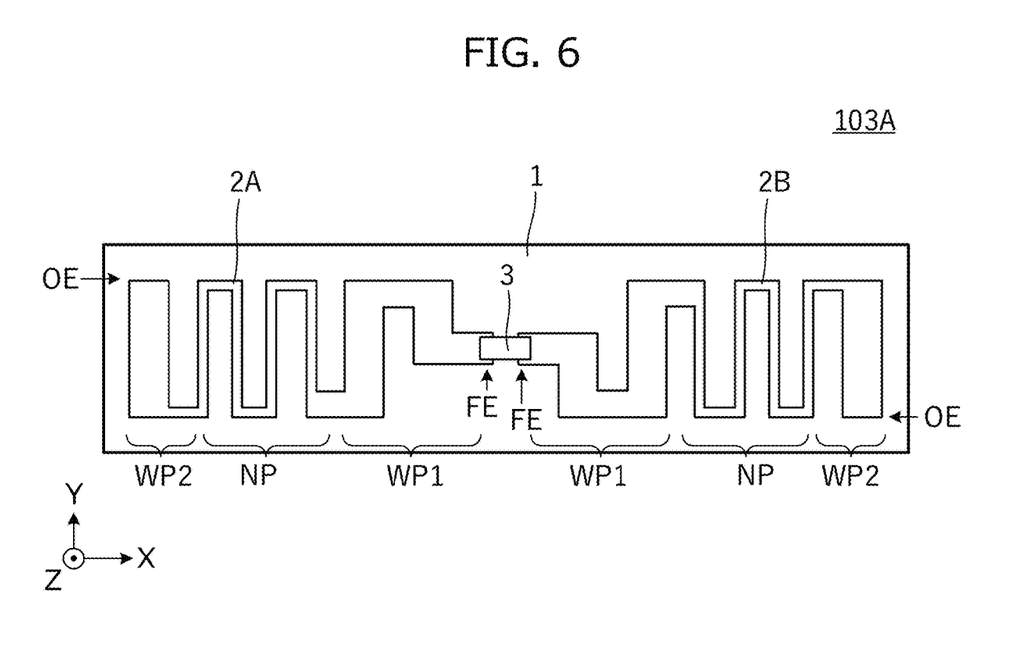
FIG. 6 is a plan view of an RFID tag 103A according to a third exemplary embodiment.

FIG. 6 is a plan view of an RFID tag 103A according to the third embodiment. The RFID tag 103A includes an insulator or dielectric base material 1, antenna patterns 2A and 2B formed on the base material 1, and an RFIC package 3 connected to the antenna patterns 2A and 2B. The line widths of the first antenna pattern 2A and the second antenna pattern 2B are not constant from the connection end FE of the RFIC package 3 to the open end OE, and each of the antenna patterns has a narrow portion NP having a narrow line width at an intermediate position. That is, each of the antenna patterns 2A and 2B has a first wide portion WP1 from the connection end FE of the RFIC package 3 to the narrow portion NP, and a second wide portion WP2 from the narrow portion NP to the open end OE.

The RFID tag 103A is different from the RFID tag 102 shown in FIG. 3A, and the shapes of the first antenna pattern 2A and the second antenna pattern 2B are point-symmetrical with the RFIC package 3 as the center. As described above, the relationship between the shapes of the two antenna patterns 2A and 2B may be either line-symmetrical or point-symmetrical. Furthermore, it may be an asymmetric configuration according to an alternative aspect.

Figure 7:
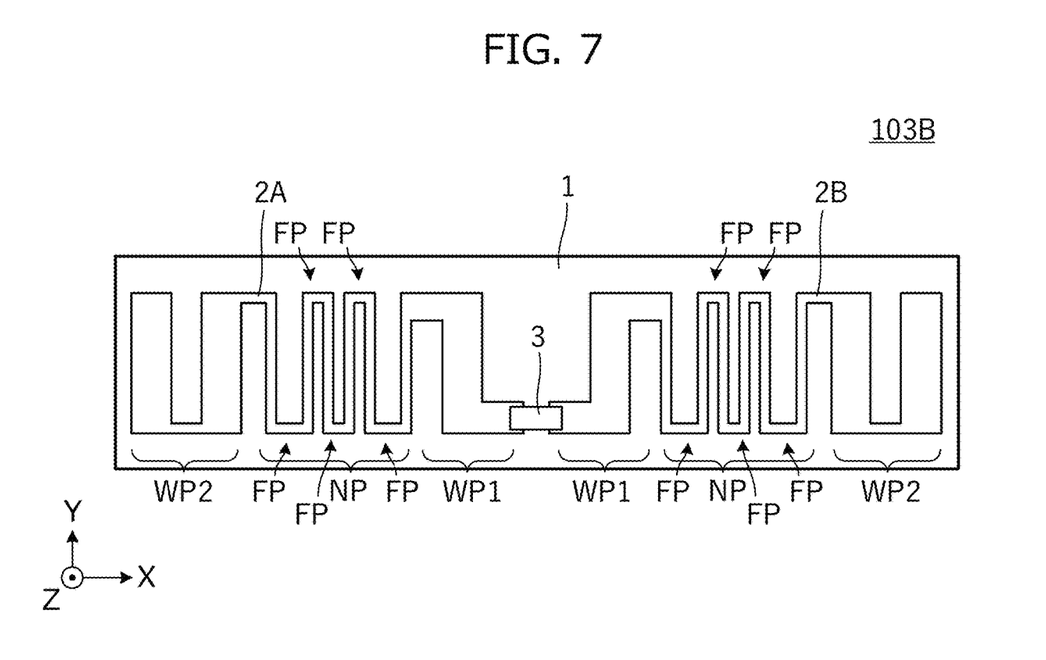
FIG. 7 is a plan view of another RFID tag 103B according to the third exemplary embodiment.

FIG. 7 is a plan view of another RFID tag 103B according to the third embodiment. The shape of the conductor pattern of the narrow portion NP is different from that of the RFID tag 102 shown in FIG. 3A. In the RFID tag 103B, the antenna patterns 2A and 2B have conductor patterns facing each other by being folded back at the folded-back portion FP, but the narrow portion NP has a place where a line spacing of the opposing conductor patterns is narrower as compared with the wide portions WP1 and WP2.

A harmonic current is concentrated on the narrow portion NP of the RFID tag 103B when it is irradiated with microwaves for electromagnetic wave heating. As shown in FIG. 7, in the narrow portion NP, not only the line width is narrow but also the line spacing is narrow, so that the temperature raising effect in the narrow portion NP is high. Therefore, it is possible to shorten the time from the irradiation of the microwave for electromagnetic wave heating to the separation of the narrow portion NP of the antenna patterns 2A and 2B.

Figure 8A:
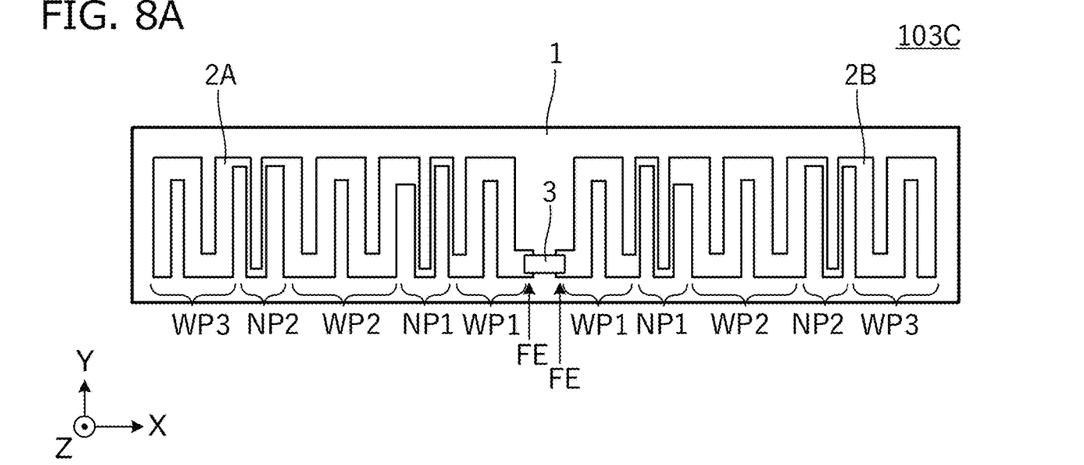
FIG. 8A is a plan view of yet another RFID tag 103C according to the third exemplary embodiment.
Figure 8B:
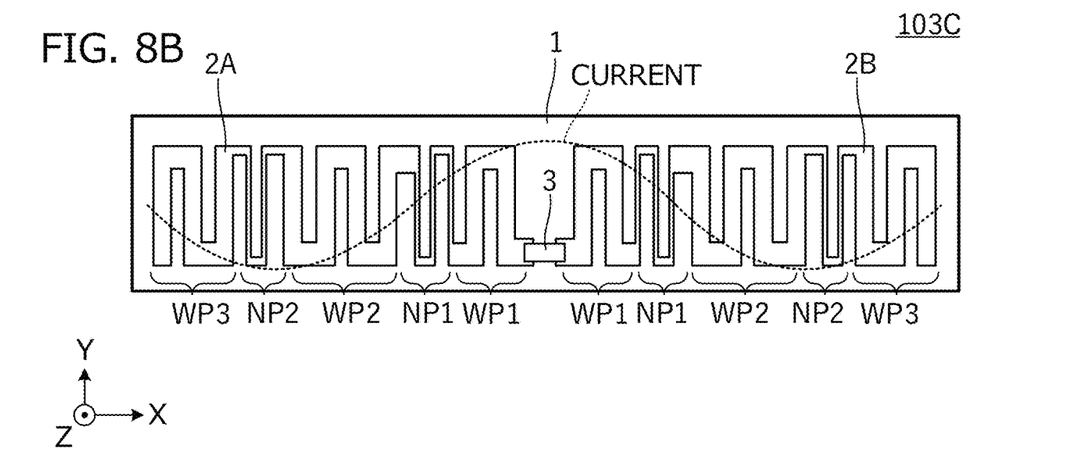
FIGS. 8B and 8C are diagrams showing intensity distributions of currents flowing through an antenna pattern of the RFID tag 103C.
Figure 8C:
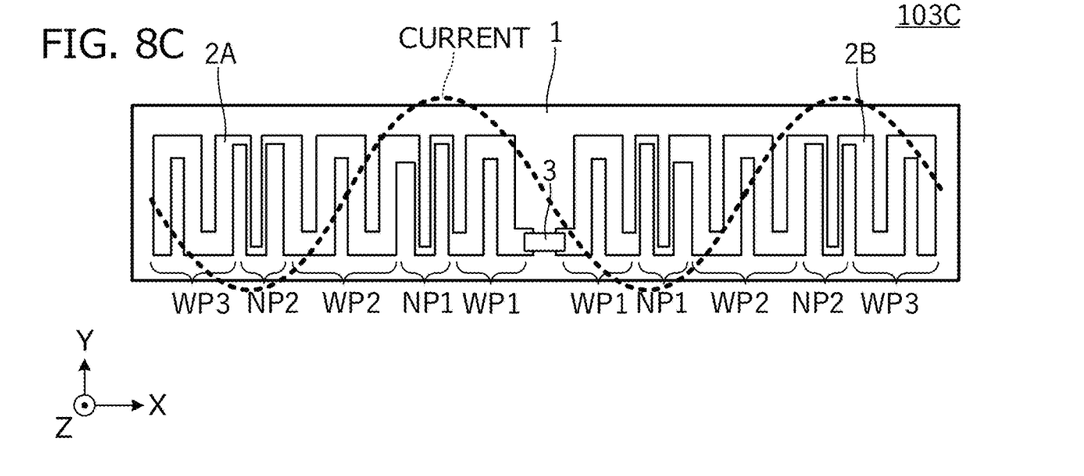

FIG. 8A is a plan view of yet another RFID tag 103C according to the third embodiment. FIGS. 8B and 8C are diagrams showing intensity distributions of currents flowing through an antenna pattern of the RFID tag 103C. The antenna patterns 2A and 2B of the RFID tag 103C have a first wide portion WP1 from the connection end FE of the RFIC package 3 to the first narrow portion NP1, have a second wide portion WP2 from the first narrow portion NP1 to the second narrow portion NP2, and have a third wide portion WP3 from the second narrow portion NP2 to the open end OE. That is, the antenna patterns 2A and 2B each have two narrow portions NP1 and NP2 according to this exemplary aspect.

In a state where the RFID tag 103C communicates with the reader/writer, a current in ¾ wavelength resonance is distributed as shown in FIG. 8B. In this communication state, the current concentration on the narrow portion NP is not strong (i.e., low), so that there is almost no loss due to the narrow line width.

On the other hand, in a state where microwave for electromagnetic wave heating is irradiated, one wavelength resonance (harmonic resonance) occurs at the antenna patterns 2A and 2B with the microwave, and the harmonic current shown in FIG. 8C flows. In this state, the narrow portions NP1 and NP2 are harmonic current concentration portions where the current is strong at a frequency of the harmonic resonance, as shown in FIGS. 8A and 8C. Therefore, the energy of the microwave for electromagnetic wave heating is concentrated in the narrow portions NP1 and NP2. That is, the energy of the microwave for electromagnetic wave heating is intensively consumed at the narrow portion NP1, NP2, and the temperature of the narrow portion NP1, NP2 is raised by Joule heat. When the temperature of the narrow portion NP1, NP2 exceeds a certain threshold value, the antenna patterns 2A and 2B are separated at the first narrow portion NP1 or the second narrow portion NP2.

As described above, as shown in certain exemplary aspects, the antenna patterns 2A and 2B can have a narrow portion NP at a place where harmonic resonance occurs by reception of the microwave for electromagnetic wave heating, and thereby a harmonic current is concentrated. Further, the narrow portion NP may be provided only in one of the first antenna pattern 2A and the second antenna pattern 2B. Even in that case, when the antenna patterns 2A and 2B are separated at the narrow portion NP by the above harmonic resonance, the effective lengths of the antenna patterns 2A and 2B are shortened, the harmonic resonance is not maintained, and heat generation due to the harmonic current is stopped.

Moreover, in exemplary aspects of the RFID tags shown above, an example is shown in which the narrow portion NP and the wide portions WP1 and WP2, and the like, of the antenna patterns 2A and 2B are discontinuously adjacent to each other, but the line width may change continuously between the narrow portion NP and the wide portions WP1 and WP2, etc.

Further, in exemplary aspects of the RFID tags shown above, an example is shown in which the antenna patterns 2A and 2B have two types of line widths in the narrow portion NP and the wide portion WP1, WP2, etc., but the line widths of the antenna patterns 2A and 2B and the like may have a plurality of types of line widths that change stepwise.

As described above with the specific configurations in each embodiment, when the product with the RFID tag is heated by the electromagnetic wave heating device, ignition of the RFID tag and even melting and deformation of members in products to which RFID tags are attached can be prevented. Therefore, the exemplary embodiments provide wireless communication devices that can construct a system for automating the accounting and bagging of purchased products at stores such as convenience stores that handle a wide variety of products such as foods and daily necessities, and can make great strides toward the practical application of "unmanned" convenience stores.

In general, it is noted that the description of the above-described embodiments is an example in all respects and is not restrictive. Modifications and changes can be made as appropriate by those skilled in the art.

REFERENCE SIGNS LIST

FE feeder circuit connection end
FP folded part
HC high current density region
NP narrow portion
NP1 first narrow portion
NP2 second narrow portion
OE open end
OP conductor patterns facing each other
WP1 first wide portion
WP2 second wide portion
WP3 third wide portion
1 base material
2A first antenna pattern
2B second antenna pattern
3 RFIC package
6 land pattern
6a first land pattern
6b second land pattern
9 RFIC chip
9a, 9b input/output terminal
10A first inductance element
10B second inductance element
10C third inductance element
10D fourth inductance element
10Aa, 10Ab, 10Ba, 10Bb, 10Ca, 10Da land
11 external connection terminal
11a first external connection terminal
11b second external connection terminal
12A first insulating sheet
12B second insulating sheet
12C third insulating sheet
13 through hole
90 feeder circuit
101, 102, 103A, 103B, 103C RFID tag
201 lunch box

The invention claimed is:

1. A wireless communication device for transmitting and receiving a communication signal, the wireless communication device comprising:
   a base material;
   an antenna pattern disposed on the base material; and
   a feeder circuit connected to the antenna pattern,
   wherein the antenna pattern comprises a line width at a harmonic current concentration portion where a current is higher than another portion of the antenna pattern at a frequency of harmonic resonance higher than a resonance frequency at a frequency of the communication signal, and
   wherein the line width at the harmonic current concentration portion is narrower than a line width at the other portion of the antenna pattern.

2. The wireless communication device according to claim 1, wherein the antenna pattern comprises a dipole-type electric field antenna with a feeding end that is connected to the feeder circuit and a tip that is an open end opposite to the feeding end.

3. The wireless communication device according to claim 2, wherein the harmonic current concentration portion is disposed at an intermediate position between the feeding end and the open end.

4. The wireless communication device according to claim 3, wherein a resonance at the frequency of the communication signal is ¼ wavelength resonance, and the harmonic resonance is ½ wavelength resonance.

5. The wireless communication device according to claim 4, wherein the antenna pattern has a meander line shape.

6. The wireless communication device according to claim 3, wherein a resonance at the frequency of the communication signal is ¾ wavelength resonance, and the harmonic resonance is one wavelength resonance.

7. The wireless communication device according to claim 6, wherein the antenna pattern has a meander line shape.

8. The wireless communication device according to claim 1, wherein the frequency of the communication signal is a frequency in a UHF band, and the frequency of the harmonic resonance is a frequency of 2.4 GHz or more and 2.5 GHz or less.

9. The wireless communication device according to claim 1, wherein the antenna pattern extends from the feeder circuit in a lengthwise direction of the base material and the line width extends in a widthwise direction of the base material that is perpendicular to the lengthwise direction.

10. The wireless communication device according to claim 9, wherein the line width at the harmonic current concentration portion is 150 μm or less, and
wherein the line width at the other portion of the antenna pattern is 300 μm or more.

11. The wireless communication device according to claim 1, wherein the harmonic current concentration portion is configured to heat and cut the antenna pattern when the antenna pattern resonates at the frequency of harmonic resonance higher than the resonance frequency of the communication signal.

12. A wireless communication device for transmitting and receiving a communication signal, the wireless communication device comprising:
a base material;
a feeder circuit disposed on the base material; and
an antenna pattern disposed on the base material and extending from the feeder circuit towards a side of the base material,
wherein the antenna pattern comprises a line pattern with at least one wide portion and at least one narrow portion, with the at least one wide portion having a larger line width than the at least one narrow portion, and
wherein the at least one narrow portion of the antenna pattern is disposed at a position on the base material, such that a current in the at least one narrow portion is higher than a current in the at least one wide portion when the antenna pattern resonates at a frequency of harmonic resonance higher than a resonance frequency of the communication signal.

13. The wireless communication device according to claim 12, wherein the antenna pattern comprises a dipole-type electric field antenna with a feeding end that is connected to the feeder circuit and an open end that is opposite to the feeding end.

14. The wireless communication device according to claim 13, wherein the at least one narrow portion of the antenna patter is disposed at an intermediate position between the feeding end and the open end.

15. The wireless communication device according to claim 14, wherein a resonance at the frequency of the communication signal is ¼ wavelength resonance, and the harmonic resonance is ½ wavelength resonance.

16. The wireless communication device according to claim 15, wherein the antenna pattern has a meander line shape.

17. The wireless communication device according to claim 14, wherein a resonance at the frequency of the communication signal is ¾ wavelength resonance, and the harmonic resonance is one wavelength resonance.

18. The wireless communication device according to claim 12, wherein the frequency of the communication signal is a frequency in a UHF band, and the frequency of the harmonic resonance is a frequency of 2.4 GHz or more and 2.5 GHz or less.

19. The wireless communication device according to claim 12, wherein the antenna pattern extends from the feeder circuit in a lengthwise direction of the base material and the line width extends in a widthwise direction of the base material that is perpendicular to the lengthwise direction.

20. The wireless communication device according to claim 12,
wherein the line width of the at least one narrow portion is 150 μm or less, and
wherein the line width of the at least one wide portion is 300 μm or more.

* * * * *